United States Patent Office 2,798,699
Patented July 9, 1957

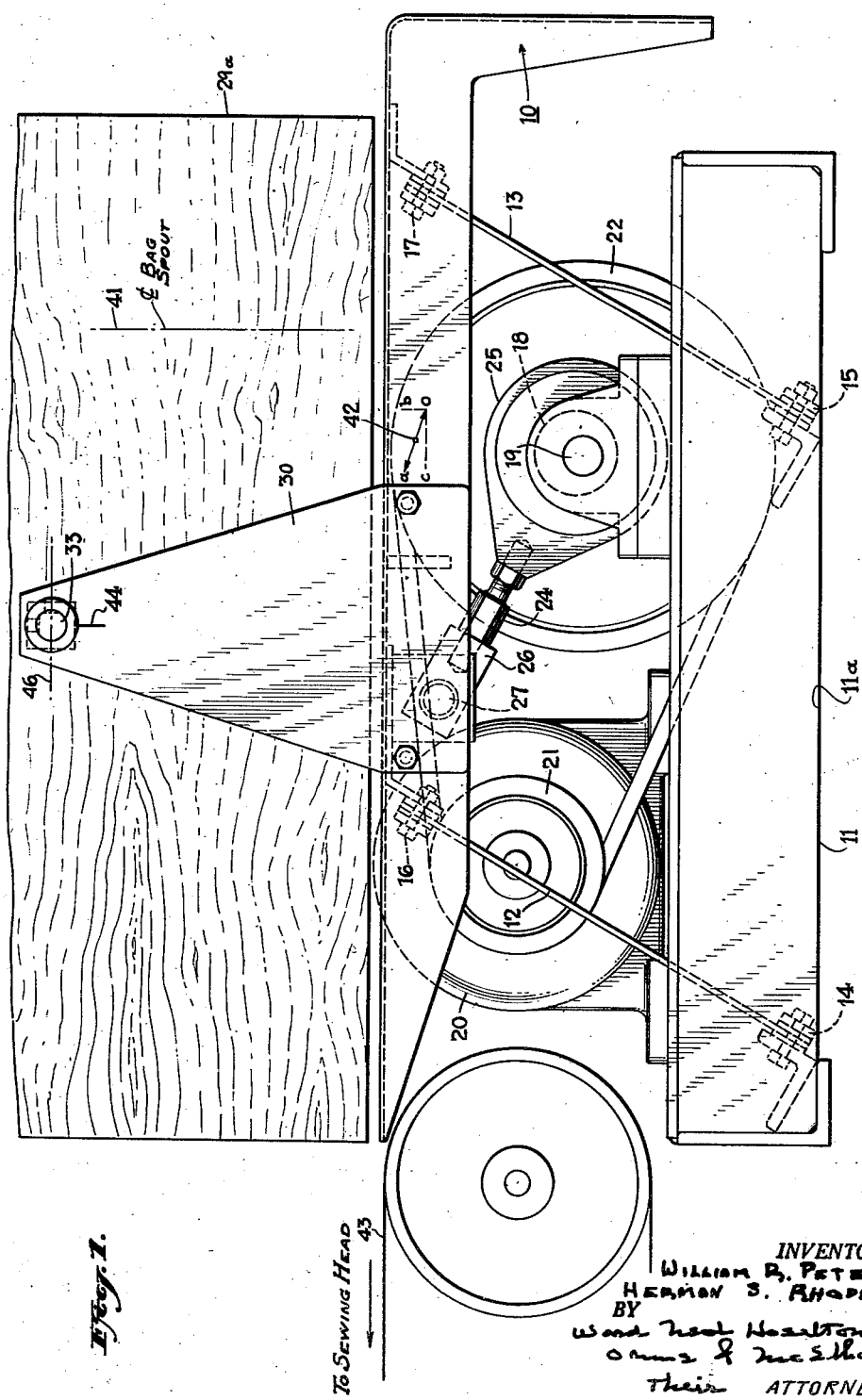

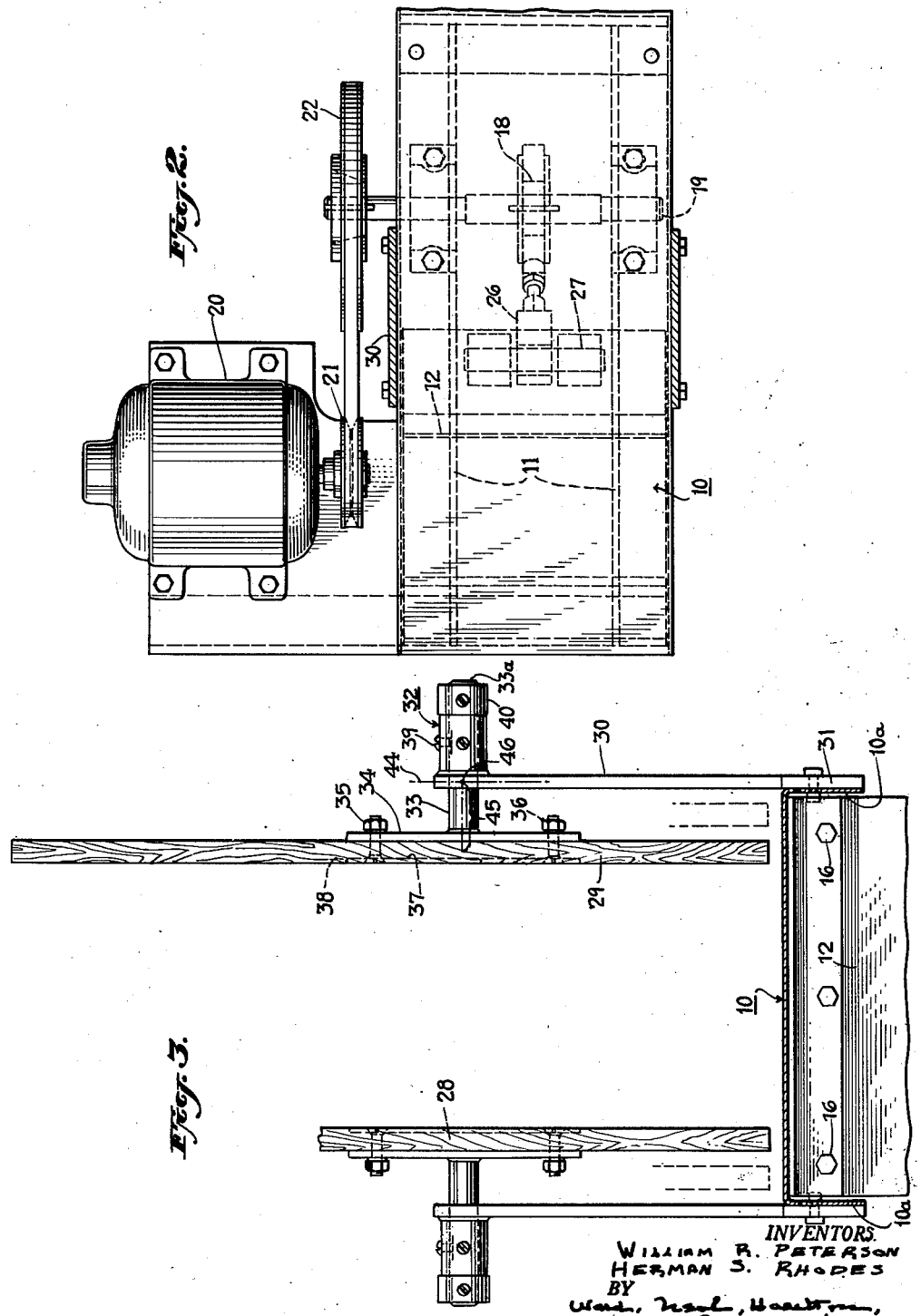

2,798,699
VIBRATING CONVEYOR WITH OSCILLATING SIDE PLATES

William R. Peterson, South Attleboro, Mass., and Herman S. Rhodes, Rumford, R. I., assignors to St. Regis Paper Company, New York, N. Y., a corporation of New York Application July 7, 1954, Serial No. 441,814

9 Claims. (Cl. 259—72)

This invention relates to settling apparatus, and more particularly to such apparatus for settling and simultaneously advancing along a selected path bags of flexible sheet material filled with a pulverulent substance.

In the filling of bags of flexible sheet material, particularly those of the valve type, one of the principal problems involved is that of settling the pulverulent material properly and quickly in order to achieve maximum economy of bag material, for example, paper. This is of particular importance in, for example, the multi-wall bag filling art where extremely large numbers of such bags are employed and where low unit cost of the bags is of high importance.

Apparatus of this general character have been suggested in the past which have achieved some success but which have failed to appreciate the advantages of simultaneously settling and shaping the filled bag thereby to facilitate the stacking or packing of a multiplicity of such bags while also simultaneously conveying the filled bag away from the bag filling machine. That is, in the interest of maximum economy of time and bag material, apparatus of this general character in the past have not appreciated the advantages of simultaneously conveying such filled bags, preshaping them while being so conveyed, and simultaneously settling the material therein.

One of the objects of the present invention is to overcome the above difficulties or to reduce same to a negligible degree.

The invention, in one aspect thereof, comprises the aforementioned settler apparatus for bags of flexible sheet material, such as multi-wall paper bags or burlap bags filled with pulverulent substance, and includes the combination of a substantially horizontal base plate for supporting one or more of the bags, there being a pair of substantially parallel mounting side board members (side plates) secured by flexible means to such base plate, each side board member being substantially upright in position. Such members are spaced in face-to-face relationship on opposite margins of the base plate thereby defining with the latter a channel along which the bags may be conveyed. Means are provided for reciprocatively moving the base plate while maintaining same substantially horizontal, such reciprocative motion having a vertical component and a component in the direction of the longitudinal center line of the base line, the resultant of such reciprocative motion being tilted upwardly in the direction along which it is desired for the bags to be conveyed. Such vibratory motion imparted to the base plate is communicated to the two spaced side board members by means of upstanding side brackets, one for each of the side board members, there being in turn a pair of side rod members for interconnecting the side brackets with the respective side board members, thereby to hold the side brackets in spaced relationship with their respective side board members. In view of such spaced relationship and in view of the aforementioned reciprocative motion imparted to the base plate, a vibratory motion will be induced in the side board members about a vertical axis passing through the side bracket and also about a horizontal axis passing through such side bracket at substantially the point of intersection with such side rod, such horizontal axis being parallel to the horizontal component of reciprocative motion. This is brought about not only by virtue of the spaced relationship between the side bracket and its respective side board member, but also by virtue of the flexibility of the side board member itself and/or some degree of flexibility of the mounting means for each side board member.

The above and further objects and novel features will more fully appear below when the description is read in connection with the accompanying drawings which form a part of the specification but which are for illustrative purposes only, the invention not being limited thereto, reference for this latter purpose being had to the appended claims.

In the drawings:

Fig. 1 is a side view, partly in section and with parts broken away, of one form of apparatus embodying the invention;

Fig. 2 is a plan view of the apparatus shown in Fig. 1 with certain parts omitted for purposes of clarity; and Fig. 3 is an end view, also with certain parts omitted for purposes of clarity, of the apparatus shown in Fig. 1.

Referring now to the drawings, with particular reference to Fig. 1, the novel apparatus includes a base plate 10 mounted for reciprocative motion above a fixed frame 11 by the following means:

A pair of leaf springs 12 and 13 are rigidly secured at each of their lower ends 14 and 15, respectively, to the aforementioned fixed frame 11. The leaf springs 12 and 13 are parallel to one another and generally spaced apart by a distance which is adequate to give adequate support to the base plate 10 to which the leaf springs are secured at 16 and 17 respectively, namely, at points longitudinally spaced along the base plate by a satisfactory distance to insure the aforementioned adequate support of the plate.

Although only two of the leaf springs 12 and 13 are shown, it is understood that it is desirable to have four such springs, one on each side of the forward (lefthand) extremity of the base plate, and one on each side of the after (righthand) extremity thereof, as viewed in Fig. 1. Alternatively said springs can comprise rigid arms pivotally mounted in rubber cushioned bushings at their lower extremities to the frame 11 and at their upper extremities to the base plate 10.

Such leaf springs thus make it possible for the base plate 10 to be moved reciprocatively upwardly and downwardly while at the same time maintaining the upper surface of the base plate horizontal or parallel to a norm plane, such as that shown at 11a comprising the upper surface of the fixed frame 11.

The reciprocation of the base plate is accomplished by means of an eccentric 18 mounted upon a shaft 19 which is drivably connected to a suitable power means comprising an electric motor 20 which is operatively connected thereto by means of a motor shaft sheave 21 and an eccentric shaft sheave 22, the latter normally being of substantially greater diameter than the former and of sufficient weight to act as a flywheel.

I have found it desirable in one form of the apparatus, by way of illustration only, to employ an eccentric having a one-half inch throw rotated, for example, between approximately 485 and 725 R. P. M. by means of said motor 20. It is, of course, understood that the invention is not limited thereto and that other eccentric strokes and frequencies can be employed.

The aforementioned eccentric 18 is drivably connected to the base plate 10 by means of a connecting rod 24 which, at one extremity, is rigidly secured to a sleeve 25 which embraces the eccentric 18, and at the other extremity is secured rigidly to a pivot block 26 having a recess for receiving a transversely extending shaft 27 which is rigidly secured to opposite sides of the base plate 10. The connecting rod 24 and its oppositely disposed eccentric sleeve 25 and pivot block 26 are preferably centrally disposed beneath the longitudinal center line of the vibrating base plate 10.

The aforementioned side boards (or side plates) are well shown in Fig. 3 at 28 and 29 and are mounted at opposite marginal portions of the base plate 10 in spaced face-to-face substantially parallel relationship. The means for mounting the side board member 29 will now be described, it being understood that similar means are employed for side board member 28:

A side bracket 30, for example, of inverted V-shape is rigidly secured to the base plate 10 at the lower extremity thereof at 31. Preferably the base plate 10 is in the shape of an inverted channel member, as is well shown in Fig. 3, thereby providing downwardly depending skirt-like flanges 10a to which the side bracket 30 can be rigidly secured, as by welding or by suitable bolt means. The side bracket 30 has secured at the upper or peak region thereof a socket member 32 of sleeve-like configuration having a central bore therethrough for embracing a side board rod member 33, the latter being rigidly secured to the side board member 29, as shown in Fig. 3.

It is desirable for the side rod 33 to be of metal which can be secured, as by welding, to a backing plate 34 which, by means of nut and bolt means 35 and 36, is rigidly secured to a reinforcing outer plate 37 which is preferably situated in a recess 38 formed in the side board member 29. The latter, for example, may be of wood, such as flexible plywood, the flexibility of which permits a quivering thereof, particularly of the front and rear end regions, when such side board member is vibrated by virtue of its connection to the vibrator means.

The socket member 32 is provided with a suitable set screw 39 for rigidly securing the side board rod 33 in an adjusted position whereby the distance between the side bracket 30 and the side board 29 can be adjusted. If desired, a collar 40 can be secured by suitable set screw to the outer extremity 33a of the side board rod 33.

I have found it desirable to secure the aforementioned side board rod 33 to the side board 29 near its center region but preferably somewhat below same, it being well shown in Fig. 3 that a larger part of the side board 29 is located above the rod 33 than below same.

In operation the novel vibratory apparatus may be positioned beneath a bag filling machine (not shown), the center of the bag filling spout of which may be directly above the broken line 41, as shown in Fig. 1, which is located intermediate the vertical center line through the rod 33 and the aftermost edge 29a of the side board 29. During the filling of the bag upon the aforementioned bag spout the motor 20 may be energized thereby to vibrate the base plate 10 and to induce also a vibratory motion in the side boards 28 and 29 which, while the bag is so held upon the spout, aid in preshaping the bag during the filling operation and in simultaneously settling the material therein. When the bag has been filled to a desired point, it is released from the bag spout whereupon the vibratory motion of the bottom plate 10 carries the bag to the left, as viewed in Fig. 1. That is, a given point upon the bottom of the bag is moved in somewhat of a sawtooth pattern of horizontal attitude. Referring to the motion of a given point on the bottom plate, such as point 42, it will be seen that the vibratory motion is slightly arcuate in configuration, the radius of the arc being parallel to the leaf springs 12 and 13. Such point 42 will describe reciprocatively the arc $oa$ which is tilted from its lowermost point at $o$ upwardly and to the left, namely, in the direction of feed of the bags towards a belt conveyor, such as that shown at 43, which may convey the bags to a sewing head. The arcuate path of the point 42 has a vertical component $ob$ and a horizontal component $oc$. By virtue of the flexibility of side board 29 and/or the spaced relationship of the side board, for example, 29 and the side bracket 30, a vibratory or slapping motion thereof will be induced by virtue of the reciprocative component $oc$, such vibratory motion being about a vertical axis 44 which passes vertically through the center of the side bracket 30 and is spaced by the radius 45 from the center of the side board 29, it being understood that analogous vibratory motion occurs in the side board 28.

A somewhat analogous vibratory motion of each of the side boards is induced by virtue of the vertical component of reciprocative motion $ob$. Consider again the side board 29 wherein such vibratory motion takes place about the horizontal axis 46 (Fig. 1) which intersects the vertical axis 44. The axis 46 is spaced from the center plane of the side board 29 by the aforementioned radial distance 45, as is well shown in Fig. 3. By virtue of the relatively smaller vertical reciprocative component $ob$ as compared to the horizontal component $oc$, the vibratory motion of the side board 29 about the axis 46 will be somewhat diminished as compared to the other vibratory motion thereof about the vertical axis 44.

The aforementioned vibratory motion of the bottom plate 10 and the side boards 28 and 29 simultaneously settles the pulverulent material in the bags while preshaping the bags and conveying same in the direction of the arrow (to the left) as viewed in Fig. 1. The side boards quivering or vibrating in the above manner, particularly about the vertical axis 44, slap the bags and help to "square" them thereby facilitating the stowing or packing thereof while simultaneously making the most economical use of the bag material by settling the pulverulent material. The bags are conveyed towards the aforementioned conveyor 43 for movement to a suitable sewing head (not shown).

Thus the slapping of the side boards 28 and 29 on the sides of the bags aids in settling the contents of the bags, aids in shaping the bags, and also assists in moving the bags in increments along the base plate 10. With the combination of such side boards and vibrating base plates, the filled bags move freely in an upright position toward, for example, a bag sewing station.

The aforementioned conveying of the bags along the bottom plate 10 is achieved at an extraordinary rate of speed by virtue of the reciprocative coaction of the bottom plate 10 and the vibratory motion or side slapping action of the side boards 28 and 29.

Although only a single embodiment of the present invention has been illustrated and described in detail, it is understood that the invention is not limited thereto. For example, the side brackets (such as bracket 30) for mounting the side plates 28 and 29 are shown as being secured to the base plate 10. However, if desired, such brackets and side plates can be mounted separately in the same position but actuated by suitable means for imparting a similar reciprocative motion thereto, such separate moving means being actuated by another suitable power source.

Various changes may be made in the design and arrangements of the parts without departing from the spirit and scope of the invention as the same will now be understood by those skilled in the art. For a definition of the limits of the invention reference will be had primarily to the appended claims.

What is claimed is:

1. In apparatus for settling pulverulent material contained in bags and simultaneously conveying such bags in a selected direction along a common selected path, a substantially horizontal base plate for supporting one or more such bags; means for mounting said base plate for reciprocative motion having a horizontal and a vertical component, the resultant of said components being tilted from its lowermost extremity in said selected direction; a pair of side plates; and means for mounting said side plates upon said base plate in spaced face-to-face relation with each other, substantially upstanding and extending in said selected direction, such plates being mounted respectively along opposite regions of said base plate which are marginal to the aforementioned path of said bags, said side plates having resilient characteristics, such mounting means including a mounting element for each side plate which is connected to such side plate at a region intermediate the front and rear extremities thereof and which is secured to said base plate whereby such mounting means secure each of said side plates to said base plate for reciprocative angular movement about a substantially upstanding axis whereby in response to reciprocation of said base plate said side plates reciprocate angularly in a quivering motion about such upstanding axis and slap the sides of the bags on said base plate thereby urging such bags along such path.

2. In a settler-conveyor apparatus for bags, the combination including: a base plate for supporting one or more such bags; means for reciprocatively moving said base plate while holding same substantially parallel to a norm plane, such reciprocative motion having primary and secondary vector components respectively parallel and perpendicular to such norm plane; a pair of side plates; and means for mounting said side plates upon said base plate in spaced face-to-face relation with each other and substantially parallel to the aforementioned primary vector component of said reciprocative motion, such mounting means including for each side plate an element secured to said base plate and to said side plate at a location intermediate the front and rear extremities of the latter, said mounting means being relatively resilient thereby to communicate to each side plate the aforementioned reciprocative motion and inducing a vibratory movement in the latter about an axis substantially perpendicular to said norm plane whereby bags located between the side plates are urged along said base plate.

3. In a settler-conveyor apparatus for bags of flexible sheet material filled with pulverulent substance and for simultaneously settling such material, shaping such bags and conveying same along a common selected path, the combination comprising: a substantially horizontal base plate for supporting one or more of such bags, such base plate being free of any surfaces interposed between same and said bags and thus directly supporting the latter; a pair of substantially parallel flexible side plates, side plate mounting means for mounting such side plates each in a substantially upright position, said side plate mounting means mounting same intermediate the side plate extremities, said side plates being in spaced face-to-face relation along opposite margins of such selected bag path upon said base plate thereby defining with the latter plate a channel along which such bag may be conveyed; vibratory means connected to said base plate and to said side plate mounting means for imparting a reciprocative motion to said base plate and side plates having a vertical component and a substantially horizontal component, the latter in the direction of the center line of the base plate, bags resting upon such base plate being lifted vertically and advanced horizontally in response to such base plate vibratory motion, said reciprocative motion imparting a quivering movement to said side plates about a substantially vertical axis near the mid-region thereof due to said substantially horizontal component of said reciprocative motion, said side plates thus slapping the sides of bags resting on the base plate in response to such quivering movement, such slapping of the bag sides by the side plates and such reciprocative motion of the base plate acting on the bag bottoms urging the bags along the base plate.

4. In a settler-conveyor apparatus for bags for settling pulverulent material in such bags and simultaneously conveying the bags along a selected path, the combination including: a base plate for supporting one or more such bags; a pair of side plates; means for mounting said side plates along said base plate and along regions thereof which are marginal to the aforementioned selected bag path; and means for reciprocatively moving said base plate and side plates while holding said base plate substantially parallel to a norm plane, such reciprocative motion having primary and secondary vector components respectively parallel and perpendicular to such norm plane; said side plates being in spaced face-to-face relation and extending substantially in the direction of the aforementioned primary vector component of said reciprocative motion, such mounting means including for each side plate an element secured to said side plate at a location intermediate the front and rear extremities of the latter, said mounting means communicating to each such side plate the aforementioned reciprocative motion and said side plates having resilient characteristics whereby such motion induces a vibratory movement in each side plate about an axis substantially perpendicular to the aforementioned norm plane whereby the sides of bags located between said side plates are slapped due to said vibratory movement, the bottoms of such bags are vibrated due to such reciprocative motion of said base plate, and the bags are urged along said base plate by the combination of such slapping of the sides and vibrating of the bottoms thereof.

5. In a settler-conveyor apparatus for bags of flexible sheet material filled with pulverulent substance, the combination comprising: a substantially horizontal base plate for supporting one or more of such bags; a pair of substantially parallel flexible side plates secured by flexible means to said base plate, each such plate being in a substantially upright position, and such side plates being in spaced face-to-face relationship along opposite margins of said base plate thereby defining with the latter plate a channel along which such bags may be conveyed, means for mounting said substantially horizontal base plate for retractile arcuate movement over a preselected path whereby two separate points longitudinally spaced along such base plate are each arcuately shiftable about their respective centers, the base plate thus being arcuately oscillatable but still maintaining the top surface thereof substantially horizontal, power means for reciprocating said base plate; a pair of side board brackets secured to opposite sides of said base plate; a pair of side boards secured to respective of said side brackets each in spaced relationship thereto, each by means of an element interconnecting same with its side bracket, each of such elements being secured to its respective side board at a region near the center thereof whereby the reciprocative motion imparted to the base plate imparts vibratory motion to each of said side boards about the vertical central axis thereof thereby to slap such bags during operation thereof to aid the forward motion thereof along such base plate.

6. In apparatus for settling and conveying bags of flexible sheet material filled with comminuted substance, the combination comprising: a substantially horizontal base plate of elongated conformation for supporting one or more of such bags; a pair of substantially parallel flexible side plates secured to said base plate, each in a substantially upright position, said side plates being in spaced face-to-face relation along opposite margins of said base plate thereby defining with the latter plate a channel along which such bags may be conveyed; means for imparting a common reciprocative motion to said base plate with respect to a norm low position, such reciprocative motion having an upward component and a component parallel to the longitudinal axis of such base plate, any selected point on the surface of such base plate thereby being moved in a reciprocative path tilted in the direction of motion along which the bags are to be conveyed; such reciprocative motion being communicated to said side plates via an interconnecting element thereby inducing a vibratory motion in the side plates about the vertical axis thereof as a result of the aforementioned horizontal component of reciprocative motion, and inducing a vibratory motion of said side plates about the horizontal axis thereof by virtue of the aforementioned vertical component of said reciprocative motion.

7. In apparatus of the class described for the settling of bags of flexible sheet material filled with a comminuted substance, a base plate for supporting one or more of such bags; means for reciprocatively raising and lowering such base plate while maintaining same parallel to a reference plane and simultaneously imparting a reciprocative motion having a component parallel to the longitudinal axis of such base plate; a pair of substantially parallel side board members; means for securing said side board members in spaced face-to-face relationship along opposite margins of said base plate and including for each such side board member: a side bracket rigidly secured to said base plate, and a side rod member secured both to its respective side board member and side bracket thereby holding the side board member and its side bracket in spaced relationship whereby the aforementioned reciprocative motion imparted to said base plate will induce vibratory motion in both of said side board members, each about a vertical and horizontal axis.

8. In apparatus for settling pulverulent material contained in bags and for simultaneously conveying such bags in a selected direction along a selected path, a substantially horizontal base plate for supporting one or more of such bags; means for mounting said base plate for reciprocative motion having a horizontal and a vertical component, the resultant of such components being tilted from its lowermost extremity towards said selected direction; a pair of side plates; means for mounting said side plates in spaced face-to-face relation, each along an opposite margin of such bag path and thus along opposite marginal regions of such base plate, such mounting means including for each side plate a mounting element secured to said side plate at a location intermediate the front and rear extremities of the latter; and power means for reciprocating said base plate and for imparting to said side plates a reciprocative angular motion about a substantially vertical axis, whereby said side plates slap the sides of bags therebetween and urge same along said base plate.

9. In a settler-conveyor apparatus for bags of flexible sheet material filled with pulverulent substance, the combination comprising: a substantially horizontal base plate for supporting one or more of such bags; a pair of substantially parallel flexible side plates; means for mounting said side plates above said base plate, said side plates being mounted in a substantially upright position and in spaced face-to-face relation above opposite marginal regions of said base plate thereby defining with the latter plate a channel along which such bags are conveyable; means for imparting reciprocative motion to said base plate, such motion having vertical and horizontal components, the resultant of such components being tilted from its lower extremity toward the direction in which the bags are to be conveyed on said base plate; said means for mounting said side plates being constructed and arranged for permitting resilient oscillatory movement of each plate about a vertical axis situated substantially between the front and rear edges thereof.

References Cited in the file of this patent
UNITED STATES PATENTS

| | | |
|---|---|---|
| 1,995,271 | Belcher et al. | Mar. 19, 1935 |
| 2,458,228 | Vredenburg | Jan. 4, 1949 |